(12) United States Patent
Boyles et al.

(10) Patent No.: US 8,552,081 B2
(45) Date of Patent: Oct. 8, 2013

(54) HIGH MODULUS BIO-BASED POLYMER FORMULATIONS

(75) Inventors: David A. Boyles, Rapid City, SD (US); Mohammad S. Al-Omar, Rapid City, SD (US)

(73) Assignee: South Dakota School of Mines and Technology, Rapid City, SD (US)

( * ) Notice: Subject to any disclaimer, the term of this patent is extended or adjusted under 35 U.S.C. 154(b) by 442 days.

(21) Appl. No.: 12/133,272

(22) Filed: Jun. 4, 2008

(65) Prior Publication Data

US 2009/0275715 A1 Nov. 5, 2009

Related U.S. Application Data

(63) Continuation-in-part of application No. 12/114,079, filed on May 2, 2008, now abandoned.

(51) Int. Cl.
*C08F 2/48* (2006.01)
*C08G 63/48* (2006.01)

(52) U.S. Cl.
USPC ............ 522/24; 522/60; 528/295.5; 528/297; 528/306

(58) Field of Classification Search
USPC .................... 528/295.5, 297, 306; 522/24, 60
See application file for complete search history.

(56) References Cited

U.S. PATENT DOCUMENTS 3,242,196 A * 3/1966 Rheineck et al. ............. 549/527
3,776,868 A * 12/1973 Cunningham ................. 526/216

OTHER PUBLICATIONS

Wool et al."Development and Application of Triglyceride based Polymers and Composites" Journal of applied Polymer Science, 2001, V.82, pp. 703-723.*
Andjelkovic, D.D. et al., "Novel thermosets prepared by cationic copolymerization of various vegetable oils—synthesis and their structure—property relationships," Journal of Polymer, 46:9674-9685 (2005).
Chen, Jianxia et al., "Epoxidation of Partially Norbornylized Linseed Oil," Macromolecular Chemistry and Physics, 203, No. 14: 2042-2057 (2002).
Fengkui, Li et al, "New Soybean Oil-Styrene-Divinylbenzene Thermosetting Copolymers. V. Shape Memory Effect," Journal of Applied Polymer Science, 84: 1533-1543 (2002).
Guner, F. Seniha et al., "Polymers from triglyceride oils," Prog. Polym. Sci. 31: 633-670 (2006).
Henna, Phillip et al., "Bio-based Thermosets from the Free Radical Polymerization of Conjugated Linseed Oil," Polymeric Materials, 93:768 (2005).
Kundu, Patit P. et al., "Novel conjugated Linseed Oil-Styrene-Divinylbenzene Copolymers Prepared by Thermal Polymerication. 1. Effect of Monomer Concentration on the Structure and Properties," Biomacromolecules, 6:797-806 (2005).
Miyagawa, Hiroaki et al., "Thermo-Physical and Impact Properties of Epoxy Containing Epoxidized Linseed Oil, 1," Macromol. Mater. Eng. 289: 629-635 (2004).
Otsu, Takayuki et al., "Radical Polymerization of Itaconic Anhydride and Reactions of the Resulting Polymers with Amines and Alcohols," Polymer International 25: 245-251 (1991).
Teng, Ganghua et al., "Epoxidized Soybean Oil-Based Ceramer Coatings," AOCS Press 77:381-387 (2000).
Warth, Holger et al., "Polyester networks based upon epoxidized and maleinated natural oils," Die Angewandte Makromolekulare Chemie 249: 79-92 (1997).
Wold, Chad R. et al., "Viscoelastic and thermal properties of linseed oil-based creamer coatings," Macromol. Chem. Phys. 201, No. 3: 382-392 (1999).
Yahiro, Kazutoyo et al., "Efficient Itaconic Acid Production from Raw Corn Starch," Journal of Fermentation and Bioengineering, 84: 375-377 (1997).

* cited by examiner

*Primary Examiner* — Ling Choi
*Assistant Examiner* — Gennadiy Mesh
(74) *Attorney, Agent, or Firm* — Gordon & Rees LLP; Laurie A. Axford; Susan B. Meyer

(57) ABSTRACT

The present invention is a high modulus bio-based polymer plastic composition or mixture and methods of preparing the same. The composition is formed from the reaction of a bio-based epoxidized triglyceride oil, an energy activated catalyst and a bio-based non-aromatic cross-linking compound to form a structural polymer plastic. The bio-based epoxidized triglyceride oil is selected from a bio-based epoxidized triglyceride or a bio-based acrylated epoxidized triglyceride. The non-aromatic cross-linking compound is selected from itaconic acid or itaconic anhydride, and the energy activated catalyst is activated by UV radiation or heat.

7 Claims, 11 Drawing Sheets

FIGURE 10

| Regime | Composition | Modulus ($E_{RT}$ MPa) |
|---|---|---|
| $F_{111B}$ | IA, Non-stoich., Initiator, Photochemical | 625 |
| $F_{111C}$ | IA, Non-stoich., Initiator, Photochemical followed by thermal | 225 (may be anomalous result, or explainable by lower cross-linking) |
| $F_{112}$ | IA, Non-stoich., No Initiator, Thermal | Rubbery |
| $F_{121B}$ | IA, Stoich., Initiator, Photochemical | 771 |
| $F_{121C}$ | IA, Stoich., Initiator, Photochemical followed by thermal | 1067 |
| $F_{122B}$ | IA, Stoich., No Initiator, Thermal | 323 |
| $F_{141B}$ | IA, Stoich with BPO Initiator, Thermal | 957 |
| $F_{211B}$ | IAc, Non-stoich, Initiator, Photochemical | 203 |
| $F_{211C}$ | IAc, Non-stoich, Initiator, photochemical followed by thermal | 1150 |
| $F_{212B}$ | IAc, Non-stoich, Thermal | 242 |
| $F_{311B}$ | AESO, Stoich., Initiator, Photochemical | 359 |
| $F_{311C}$ | AESO, Stoich., Initiator, Photochemical followed by thermal | 549 |
| $F_{312B}$ | AESO, Stoich., Initiator, Thermal | 114 | ized
HIGH MODULUS BIO-BASED POLYMER FORMULATIONS

CROSS REFERENCE TO RELATED APPLICATION

This is a Continuation In Part application which claims priority benefit of U.S. patent application Ser. No. 12/114,079, which was filed on May 2, 2008.

GOVERNMENT FUNDING

The invention described herein was made with government support under United States Department of Agriculture, USDA, Cooperative State Research, Education, and Extension Services (CSREES), Non-Food Characterization/Process/Product Research, Agreement Number 2003-35504-12863 CFDA #10.206. The U.S. Government has certain rights in this invention.

FEDERALLY SPONSORED RESEARCH

United States Department of Agriculture, USDA, Cooperative State Research, Education, and Extension Services (CSREES), Non-Food Characterization/Process/Product Research, Agreement Number 2003-35504-12863 (Accession No.: 0193688, Project No.: SDR-RP02-051, Proposal No.; 2002-01520).

TECHNICAL FIELD

The present invention relates to polymers and plastics. More specifically it relates to compositions and methods of making high modulus polymers and plastics for structural applications from non-petroleum bio-based compounds which are bio-renewable.

BACKGROUND OF THE INVENTION

Presently all structural polymers that are manufactured contain one or more compounds derived from petroleum sources. Because of this, the cost to produce these polymers will fluctuate with the cost of oil. The recent volatility in the oil market has resulted in a substantial increase in the cost per barrel with a corresponding increase in the chemicals and compounds obtained from petroleum. These price increases are compounded by the fact that oil reserves are finite and non-renewable.

In addition to rising manufacturing costs, health issues arise with these polymers because some of the compounds used in their production are known endocrine disruptors. Endocrine disruptors interfere with the body's endocrine system and produce adverse developmental, reproductive, neurological and immune effects in humans. Some of the commonly used chemicals used in the production of plastics suspected of acting as endocrine disruptors include diphenyl ethers, bisphenols, styrenes and a variety of phthalates. Exposure can result from direct contact with these chemicals or through ingestion of contaminated, food, water or air. Industrial workers can be exposed to these chemicals through direct contact when working with resins or plasticizers that contain these compounds. In addition, byproducts of some chemical and manufacturing processes including burning of plastics can release endocrine disruptors into the air or water.

Recent studies indicate that ingestion of endocrine disruptors can result when these chemicals leach out of plastics used in everyday products such as plastic food containers and plastic water bottles. In addition, many endocrine disruptors are persistent in the environment and accumulate in fat so the greatest exposure can come from consuming fatty foods and fish from contaminated water. While a variety of pathologies may eventually be linked to these compounds, current investigations indicate that endocrine disruptors may contribute to miscarriages, lower fertility, increased incidence of endometriosis, obesity and some cancers.

Styrene, which has been identified as an endocrine disrupter has also been classified as a possible human carcinogen by the World Health Organization's International Agency for Research (IARC), Environmental Protection Agency (EPA) and The National Institute for Occupational Safety and Health (NIOSH). Styrene is a significant component in many current structural formulations wherein it is used as a significant monomer with or without bio-based materials. The EPA OPPT Chemical Facts Sheet for styrene eludes to this fact and states that "(T)he consumption of styrene in the United States may further decline in the future due to the Clean Air Act mandate on reduction in the volume of allowable styrene emissions".

Like styrene divinylbenzene is also identified as an endocrine disruptor and is a significant component in structural polymer formulations. It is used with or without bio-based materials to impart cross-linking and rigidity. The concern for this compound is suggested in the divinylbenzene Material Safety Data Sheet (MSDS) which states "the toxicity of divinylbenzene may resemble that of styrene" and NIOSH which states "Insufficient data are available on the effect of this substance on human health, therefore the utmost care must be taken".

Because of these and other environmental reasons, alternative compounds and sources of compounds that eliminate these concerns have now become the focus of global research. Materials derived from renewable resources such as plants offer an abundant, low cost and sometimes biodegradable alternative to their petroleum-based predecessors (Andjelkovic, D. D. et al., Journal of Polymer, 46:9674-9685 (2005)). To date, a variety of natural occurring plant oils have been utilized to prepare polymers (Wool, R. P. and Xinzhi, S. S. "Bio-based polymers and composites" Amsterdam; Boston: Elsevier Academic Press (2005) and Wool, R. P. and Shrikant, N. K. "Bio-Based resins and natural fiber". ASM International Materials Park, Ohio, USA (2006).

Natural plant oils such as soybean and linseed consist predominantly of triglycerides which are esters comprising a glycerol moiety and three molecules of fatty acids. Of the known fatty acids that comprise triglycerides the highly unsaturated fatty acids such as linoleic and linolenic are of particular interest for the preparation of polymers. It is the unsaturated carbon-carbon double bonds of the fatty acids that are utilized in polymer formation. The degree of unsaturation is represented by the iodine value of the triglyceride and is the amount of iodine (mg) that will react with a 100 gram sample under specified conditions (F. S. Güner et al Prog. Polym. Sci. 31:633-670 (2006)). Triglycerides with iodine values greater that 130 are considered drying oils. These oils are the most widely used in the coatings industry in the preparation of oxypolymerized oils, polyesters, polyesteramides, polyamides, polyurethanes, acrylic resins and epoxy resins.

Formulations containing bio-based oils such as triglycerides have been used historically for a variety of purposes. These formulations often comprise acrylated epoxidized triglyceride resins and are generally flexible minimally cross-linked amorphous polymers with little or no structural strength. They are often used in surface coatings including varnishes, lacquers, caulking, adhesives, printing inks and shoe polishes. The flexible chains of triglycerides have been considered valuable for low modulus materials but not for use alone in preparing high modulus materials.

Crosslink density has been recognized as an indicator of the rigidness of a polymer. Flexible polymers typically have low crosslink densities while high crosslink densities have been recognized as necessary for high modulus materials. Rigid aromatic cross-linking reagents such as divinylbenzene and bisphenol A have been used to create higher modulus polymers with triglycerides, sometimes using styrene to enhance rigidity (Lewis U.S. Pat. No. 4,040,994, Drzal Macromol Mater. Eng. 289; 629-635, (2004), Larock Biomolecules 6:797-806, (2005)). These types of polymers have been developed from modified soybean and linseed oils (Warth H. et al., Die Angewandte Makromolekular Chemie., 249:79-92 (1997) at the University of Delaware, Iowa State University, and the Michigan State University.

Richard Wool at the University of Delaware focused on bio-based materials produced from different triglyceride monomers utilizing different amounts of styrene (ST). Acrylated epoxidized soybean oil (AESO) monomer was prepared by reaction of acrylic acid with epoxidized triglycerides. Subsequently, AESO was blended with reactive diluents, such as styrene to improve the processability of AESO and to control the resultant polymer properties in order to achieve a wide range of structural applications. The pure AESO polymer exhibited a tensile modulus of 440 MPa, with a tensile strength of 6 MPa. When the AESO polymer was blended with 40% of styrene, the moduli was 1.6 GPa with a 21 MPa tensile strength.

Maleinized soybean oil monoglyceride (SOMG/MA) was synthesized by a two step process from triglyceride oil. A standard glycerolysis reaction was performed converting the triglyceride to monoglyceride followed by the addition of 2-methylimidazole, ST and triphenyl antimony with a 3:2 weight ratio of glycerol to maleic anhydride. The copolymer of SOMG/MA with styrene had an observed tensile strength equal to 29.4 MPa with a modulus of 0.84 Gpa. The addition of diols such as neopentyl glycol (NPG), and bisphenol A (BPA) during maleinization increased the tensile strength to 15.6 MPa with a modulus of 1.49 GPa.

Acrylated epoxidized linseed oil (AELO) was synthesized from epoxidized triglyceride by treatment with by acrylic acid (AA), and the residue epoxy groups and the newly formed hydroxyl groups were subsequently modified using maleic anhydride in the presence of ST. AELO formed rigid polymers when polymerized with comonomers such as styrene.

Richard Larock at the Iowa State University developed a number of chemistries to convert triglycerides into useable materials. Among these are cationic, thermal, and free radical polymerization Mohanty, A. K. et al., "Natural Fibers, Biopolymers, and Biocompositions" Chapter 23. CRC Press, Taylor & Francis Group, Boca Raton (2005).

Cationic copolymerization of soybean oil (SOY), ST, and divinylbenzene (DVB) gave dense polymeric materials that ranged from elastomers to rigid plastics. When thermal copolymerization of tung oil, ST, and DVB was performed a, transparent, rubbery material was obtained. Radical polymerization was performed in order to copolymerize conjugated vegetable oils with acrylonitrile. The resultant polymeric material was transparent and rigid (Mohanty, A. K. et al., supra).

A series of bio-based, shape memory polymers were also synthesized by cationic copolymerization of soy oil with cross-linking agents such as dicyclopentadiene (DCP, a by-product of petroleum) initiated by boron trifluoride diethyl etherate (BFE) or modified using Norway fish oil (NFO), or fatty acid ester, which resulted in a series of new thermosetting rubbery materials with variable degree of rigidity (Mohanty, A. K. et al., supra; Larock, C. R. and Andjelkovic, D. D., Polymeric Materials, 93:882 (2005), Larock, R. C. and Fengkui L., Journal of Applied Polymer Science. 84:1533-1543 (2002), Marlen, V. and Larock, C. R. (2005), Polymer, 93:767 (2005) and Larock, H. P. and Richard C., Polymeric Material, 93:768 (2005)).

As shown in the table below, a variety of polymeric materials ranging from elastomers to rigid plastics were synthesized from the cationic polymerization of various soybean oils and petroleum-based alkene monomers.

| Polymer | $T_g$ (° C.) | Crosslink density (mol/m$^3$) | Damping (tan δ) |
|---|---|---|---|
| SOY45-ST07-DVB40-[NFO5-BFE3] | 86 | $4.8 \times 10^3$ | 0.09 |
| SOY45-ST00-DVB47-[NFO5-BFE3] | 72 | $5.7 \times 10^3$ | 0.07 |
| LSS45-ST00-DVB47-[NFO5-BFE3] | 71 | $1.6 \times 10^4$ | 0.19 |
| CLS45-ST00-DVB47-[NFO5-BFE3] | 105 | $4.0 \times 10^4$ | 0.10 |

Lawrence Drzal at the Michigan State University has prepared bio-based materials consisting of ELO with petroleum-derived additives in large proportions including diglycidyl ether of bisphenol F (DGEBF), methyltetrahydrophthalic anhydride (MTHPA), used as a curing agent and 1-methylimidazole used as an accelerator (Miyagawa, H, et at., Macromol. Mater. Eng., 289:629-635 (2004)). It was observed that increasing the amount of ELO in the polymer decreased the storage modulus from 3.2 to 1.7 GPa. Thus, it was possible to replace a large amount of petroleum-based DGEBF with ELO with deleterious effects on storage modulus.

In all of the research noted above and as was generally understood at the time of the investigations, aromatic petroleum-based compounds were required and used as agents to increase rigidity of the plastic obtained from bio-based oils. Recently, a number of these petroleum based compounds have been found to act as endocrine disruptors. Leaching of these compounds from polymers containing these compounds used in food storage or as liquid containers has raised significant health issues. Additional concerns arise for workers during formulation and processing of these polymers when toxicological hazards are present.

Consequently, there is a need in the art for structural plastics that do not utilize petroleum based compounds and are prepared solely from renewable source materials such as unsaturated triglycerides from plant oils with renewable non-petroleum-based comonomers.

BRIEF SUMMARY OF THE INVENTION

The present invention is a bio-based high modulus or structural polymer plastic or compositions and methods of making the same. In one aspect of the present invention, a structural polymer plastic is provided comprising a bio-based epoxidized unsaturated triglyceride polymerized with a non-aromatic bio-based cross-linking compound. The bio-based epoxidized unsaturated oil is preferably a drying oil having an iodine number greater than or equal to 130 and may include linseed oil, fish oil, veronica oil, a combination of linseed oil and soybean oil, a combination of fish oil and soybean oil, or a combination of veronica oil and soybean oil as well as other oils having sufficient unsaturation. The non-aromatic bio-based cross-linking compound is preferably itaconic acid or itaconic anhydride.

In another aspect of the present invention, methods are provided for the preparation of the bio-based structural polymer plastic. In one preferred embodiment, a method of preparing a structural polymer plastic is disclosed comprising: mixing a bio-based epoxidized unsaturated triglyceride with a non-aromatic bio-based cross-linking compound and bio-based energy activated curing compound, dispensing the mixture into a mold and curing the mixture in the mold until a structural polymer plastic is formed. The bio-based epoxidized unsaturated oil of this method is preferably a drying oil having an iodine number greater than or equal to 130 and may include linseed oil, fish oil, Veronica oil, a combination of linseed oil and soybean oil, a combination of fish oil and soybean oil, or a combination of veronica oil and soybean oil as well as other oils having sufficient unsaturation. The energy activated curing compound or catalyst may be UV activated or heat activated. Particularly preferred UV activated catalysts include benzophenone, p-methoxybenzophenone, acetophenone, m-chloroacetophenone, propiophenone, xanthone, benzoin, benzyl, benzaldehyde, naphthoquinone, anthraquinone or benzoin butyl ether. These compounds may be provided in amounts not less than about 0.01 percent by weight and may be greater than 1.00 percent by weight. Alternatively a heat activated catalyst such as benzoyl peroxide, 2,2'-azo-bis-isobutyronitrile or related radical initiators may be used. The non-aromatic bio-based copolymer is preferably itaconic acid or itaconic anhydride. Curing of the polymer mixture may be by light including sun light or UV irradiation.

In yet another aspect of the present invention, a mixture is provided comprising a bio-based epoxidized unsaturated triglyceride oil, itaconic acid or itaconic anhydride and a bio-based curing compound.

Other aspects of the present invention are described throughout the specification.

BRIEF DESCRIPTION OF THE DRAWINGS

FIG. 10 table of DMA results and results of crosslink density calculations.

DETAILED DESCRIPTION OF THE INVENTION

Definitions

Unless defined otherwise, all terms used herein have the same meaning as are commonly understood by one of skill in the art to which this invention belongs. In the event that there is a plurality of definitions for a term herein, those in this section prevail.

The term "bio-based" as used herein refers to a compound or polymer obtained or prepared from renewable resources such as plants or animals and excludes compounds or polymers obtained or prepared from non-renewable resources such as petroleum. The term "bio-based" when used in reference to a compound may refer to compounds derived from plant or animal sources that are prepared synthetically from elements not obtained or prepared from petroleum.

The term "mixture" as used herein refers to a composition containing one or more compounds in a solution or two or more compounds joined together in solid form. For example NaCl dissolved in $H_2O$ forms a salt solution or salt mixture, correspondingly NaCl and MgCl dissolved in $H_2O$ forms a salt solution or salt mixture. In addition, combining crystalline NaCl and MgCl in a container is a salt mixture. This term also refers to solutions wherein the compounds contained therein will react to form another compound that have not as yet fully reacted to form the final compound. For example, the joining of two copolymers that can react to form a single polymer or joining a polymer such as linseed oil with a cross-linking reagent such as itaconic acid to form a single crosslinked polymer.

The term "drying oil" as used herein refers to a naturally occurring oil having a drying index equal to or exceeding 70 and an iodine value from between about 90 to about 130. The drying index of an oil is calculated as the percent linoleic acid in the oil plus 2 times the percent linolenic acid in the oil. The iodine value is determine by the amount of iodine in milligrams that reacts with a 100 gram sample of a triglyceride.

The term "epoxidized" as used herein refers to replacement of some or all carbon-carbon double bonds in the unsaturated fatty acid of a triglyceride with a highly reactive cyclic ether or oxirane group. These highly strained three-membered rings containing one oxygen and two carbon atoms are more reactive than the carbon-carbon double bonds of the unmodified triglyceride allowing greater cross-linking.

The present invention is a bio-based structural polymer plastic comprising a bio-based epoxidized unsaturated triglyceride, a bio-based energy activated curing compound and a non-aromatic bio-based cross-linking compound. The non-aromatic bio-based cross-linking compound is preferably itaconic acid or itaconic anhydride.

Figure 2:
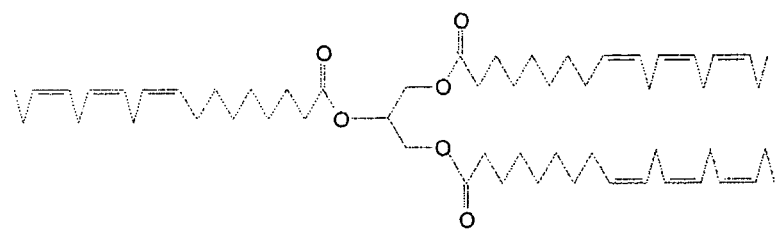
FIG. 2, Chemical structure of a triglyceride having trilinolein acid side chains.

Triglycerides are an abundant renewable resource primarily derived from natural plant or animal oils that contain esterified mono- to poly-unsaturated fatty acid side chains. Trilinolein is one of the triglycerides available from flax seed and is shown in FIG. 2. This compound contains three molecules of linolenic acid esterified with one molecule of glycerol (Wool, R. P. and Xinzhi, S. S. supra and Wool, R. P. and Shrikant, N. K. supra). While a variety of triglycerides may be utilized with the present invention, particularly preferred triglycerides are those designated as drying oils having a drying index equal to or greater than 70. The drying index is equal to the percent linoleic acid plus 2 times the percent linolenic acid in the triglyceride. (Wold, C. R. and Soucek, M. D., Macromol. Chem. Phys., 201:382-392, (1999)). For example, linseed oil comprises an average of 53% linolenic acid, 18% oleic acid, 15% linoleic acid, 6% palniltic acid, and 6% stearic acid. In addition, triglycerides having iodine values between about 90 to 130 are also preferred (Wold, C. R. and Soucek, M. D., Macromol. Chem. Phys., 201:382-392, (1999)). Preferred natural oil triglycerides for use in the present invention include linseed, soybean, fish, veronica or a combination of soybean with linseed, fish, or veronica as well as other oils having sufficient unsaturation.

Historically triglyceride polymers have been known for their flexibility owing to their high density of alkyl chains, lack of aromatic rings and low cross-linking efficiency. To obtain more rigid structural polymers cross-linking was increased by epoxidation of the triglyceride. Epoxidation converts carbon-carbon double bonds in the fatty acid chains of the triglycerides to three membered oxirane rings and may be accomplished by mixing refined oil with peracids such as m-chloroperoxybenzoic acid (m-CPBA), peroxyformic acid, peroxyacetic acid, perbenzoic acid or hydrogen peroxide (Soucek, M. R., et al., Macromol. Chemical Phys. 203:2042-2057, (2002), Soucek, M. D. and Teng, G., JAOCS 77:381-387, (2000)). All of these compounds are petroleum based. They are reaction initiators and not contribute to the structure of the final product other than being necessary to introduce oxygen atoms to form oxirane rings as epoxide groups. In addition, the epoxide groups are generally more reactive than the carbon-carbon double bonds of unmodified triglycerides toward some types of reactions. The extent of triglyceride epoxidation is represented by its oxirane value. The higher this value the greater the number of cross-linking events that may be expected in a polymerization reaction. These highly reactive oxirane rings substantially increase cross-linking efficiency which results in increased structural strength of the polymer.

Current art teaches that high modulus materials from triglycerides or triglyceride derived oils requires rigidity at the molecular level. Since this rigidity cannot be obtained from flexible alkyl and alkenyl chains of triglycerides or triglyceride derived oils, chemical components in addition to the triglyceride or triglyceride derived oils must be used to formulate high modulus materials, otherwise flexible and rubbery materials are known to be obtained. Many such additional chemical components are used, all of which are aromatic ring containing compounds. Since aromatic ring containing compounds are not easily obtainable from nature but are easily obtainable from petroleum, aromatic ring containing compounds of petroleum origin have been used. These include commercially available epoxy and vinyl resins, styrene, divinylbenzene, for example, and commercially available aromatic amine curing agents such as 4,4'-oxydianiline (ODA), paraphenylene diamine, and many other aromatic ring containing compounds. The aromatic rings of these materials impart rigidity to the materials at the molecular level which cannot be attained using triglyceride or triglyceride derived oils alone. All examples of high modulus materials in the literature include aromatic ring containing compounds used in conjunction with triglycerides or triglyceride derived oils to impart desired rigidity, leading to high modulus materials in the bulk which are neither flexible nor rubbery.

The current discovery uses a highly specific non-aromatic compound alone in its formulation with triglyceride derived oils to obtain high modulus materials of the present invention. Contrary to conventional beliefs that aromatic compounds are required for high modulus materials no such compounds are used, either of petroleum or other origin. The final high modulus materials are thus obtained by a judicious and unique combination of chemical compounds which unexpectedly lead to complex and highly crosslinked chemistries at the molecular level. These chemistries result in the attainment of high modulus properties at the bulk level of the final materials without the use of aromatic ring containing compounds.

Figure 4:
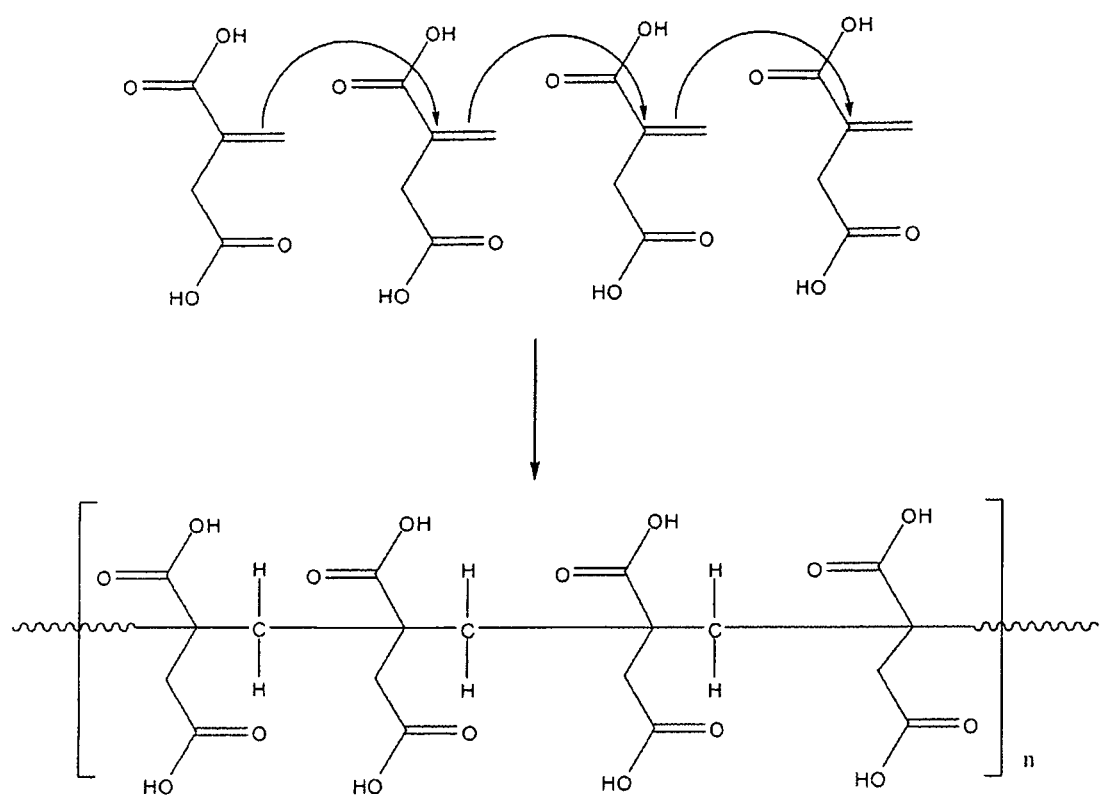
FIG. 4, A schematic representation of polymerization of carbon-carbon double bond formation of itaconic acid.
Figure 5:
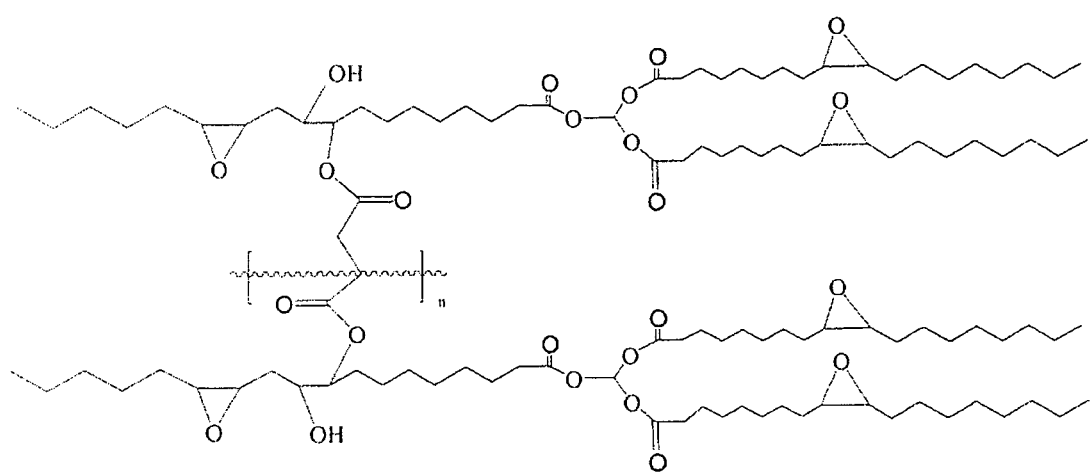
FIG. 5, One chemical structure of the ELO.

Bio-based cross-linking compounds are molecules that react with neighboring molecules of the same structure or with those of different structures having reactive groups able to bind the cross-linking compound. Preferred cross-linking compounds are non-aromatic aliphatic dibasic acids or anhydrides of these dibasic acids such as itaconic acid and itaconic anhydride. The bio-based non-aromatic cross-linking compound itaconic acid, for example, forms chains of varying length by interacting with neighboring acid molecules. This occurs when the double bonded carbon reacts with other carbon-carbon double bonds of neighboring molecules forming —$CH_2$ linkages (FIG. 4). When these chains of itaconic acid are mixed with epoxidized triglycerides the —OH groups of the acid react with the epoxide groups of the triglyceride forming ester bonds and cross-linking the triglyceride molecules (FIG. 5).

Itaconic acid (IAc) (methylenesuccinic acid, 2-methylidenebutanedioic acid) is a dicarboxylic acid having five carbons. The basic chemistry of itaconic acid is similar to that of the dicarboxylic acids derived from petroleum. Itaconic acid is presently produced via aerobic fungal fermentation of carbohydrates, primarily corn starch (Yahiro, K. et al Journal of Fermentation and Bioengineering, 84:375-377 (1997)), by means of *Aspergillus terreus* or *Aspergillus itaconicus*.

Figure 1:
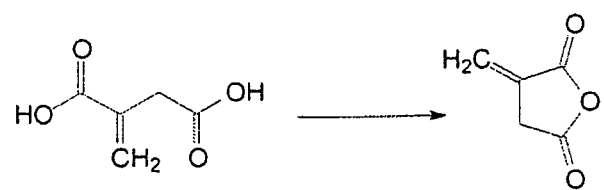
FIG. 1, Preparation of itaconic anhydride from itaconic acid dehydration.

Itaconic anhydride (IA), (2-methylenesuccinic anhydride, methylenesuccinic anhydride, dihydro-3-methylene-2,5-furandione), may be prepared by dehydrating IAc to affect ring closure (FIG. 1) (Otsut, J. Y. et a. Polymer International, 25:245-251 (1991)). IA contains a disubstituted exo-cyclic carbon-carbon double bond making the IA more reactive than its isomeric citraconic anhydride, which contains a trisubstituted endo-cyclic carbon-carbon double bond.

Both itaconic acid and itaconic anhydride have ideal solubilities that when heated with epoxidized linseed oil (ELO) will result in a pourable pre-resin that can subsequently be cured to a rigid material in a mold.

Figure 3:
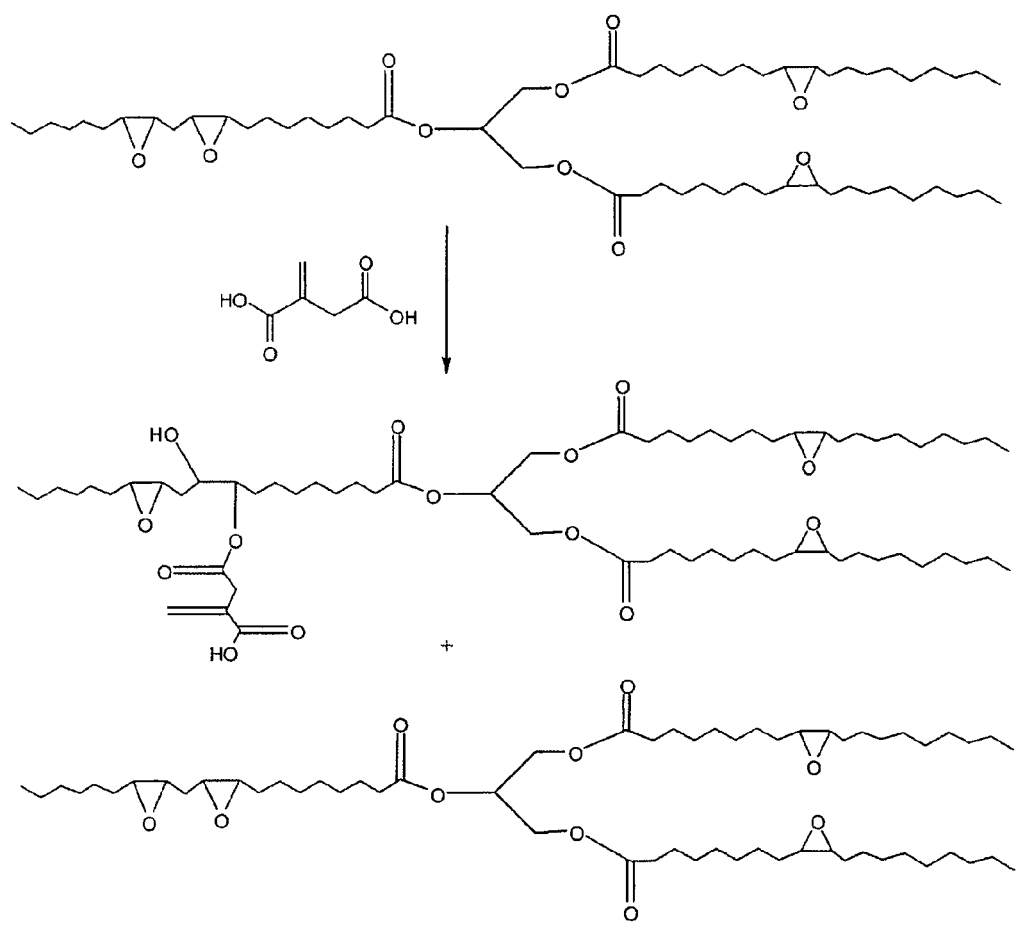
FIG. 3, A schematic representation of the formation of an ester of epoxidized linseed oil with itaconic acid.

The polymers of the present invention are prepared by combining the bio-based epoxidized triglyceride with a bio-based non-aromatic cross-linking compound. These compounds are mixed while being heating until the bio-based non-aromatic cross-linking compound is completely dissolved and a clear pre-resin liquid is obtained. An energy activated curing compound or catalyst is then added to the pre-resin and mixed. This mixture may then be sealed in a container that prevents the unpolymerized resin from polymerizing. Such a container may prevent light from contacting the unpolymerized polymer containing a UV activated curing compound or may protect the unpolymerized polymer from heat when it contains a heat activated curing compound. Alternatively the polymer mixture may be poured or extruded into a mold and then radiated or heated to fully cure the polymer to form a rigid structural polymer of the desired shape (FIG. 3).

The catalyst may be activated by either ultraviolet radiation or heat. The catalyst promotes the chemical cross-linking reaction but is not consumed in the reaction. For example photo-excitation of Bz catalyzes polymerization of the itaconic anhydride carbon-carbon double bonds by radical polymerization. Radical polymerization may also be achieved by BPO, 2,2'-azo-bis-isobutyronitrile or other related radical initiators, although the thermal conditions necessary to initiate radical reaction and polymerization of the itaconic anhydride carbon-carbon double bonds simultaneously resulted in thermal polymerization of the anhydride functionality with the epoxide groups of ELO. Thus, Bz led to partial cure by a radical chemical mechanism, while BPO coupled with the requisite thermal conditions effected a doubly-crosslinked cure by two chemical reactions one radical and the other stepwise. Particularly preferred UV activated catalysts include benzophenone, p-methoxybenzophenone, acetophenone, m-chloroacetophenone, propiophenone, xanthone, benzoin, benzyl, benzaldehyde, naphthoquinone, anthraquinone or benzoin butyl ether. These compounds may be provided in amounts not less than about 0.01 percent by weight and as much as or more than about 1.00 percent by weight. Alternatively a thermally activated catalyst such as benzoyl peroxide may be used.

EXPERIMENTS

Experiment 1

Polymerization of non-stoichiometric Amounts of ELO with IA

Formulation 1, Regime 1, Path 1, Stage B ($F_{111B}$), Non-stoichiometric amounts of IA with ELO determined empirically to ascertain amounts according to their mutual solubility. Approximately 12.9 g (0.013 mol) of ELO and 2.1 g (0.019 mol) of IA were mixed in a flask with constant heating until the IA was completely dissolved and a clear viscous pre-resin liquid was obtained. Approximately, 0.08 g ($3.77 \times 10^{-4}$ mol) of benzoin (Bz) was then added to the viscous liquid and mixed. This mixture was poured into a mold and placed in sunlight for 16 hours. Following exposure a stiff yellow polymer was obtained.

Formulation 1, Regime 1, Path 1 Stage C ($F_{111C}$) The polymer obtained in $F_{111B}$ was further cured by heating in an oven at 100° C. for 12 hours to assess the extent of photochemical curing.

Formulation 1, Regime 1, Path 2 ($F_{112}$) The pre-resin of $F_{111B}$ was poured into a mold and heated in an oven at 100° C. for 12 hours for direct thermal curing. The resultant material was oily, consequently it was heated for an additional 12 hours. The resulting material was a dark yellow and flexible.

DMA testing was initially performed at 10 N oscillating force. Viscoelastic properties of the cured materials in this Example were obtained using the TA DMA Q800 instrument (CAS-MI Laboratory, Ypsilanti, Mich.) in a single cantilever clamp. A rectangular specimen of $F_{111B}$ having the dimensions, 3.21 mm thick, 1.95 mm wide, and 17.03 mm in length, was held between the clamp holders and heated at a rate of 5° C./min starting from room temperature up to 150° C. The frequency was maintained at 1 Hertz.

The damping properties of cured material were quantitatively evaluated by the loss tangent maximum (tan $\delta$)$_{max}$. The results indicate that only one transition was obtained in $F_{111B}$ occurring at 78.39° C. with a storage modulus of 171 MPa and a loss modulus of 25 MPa (tan $\delta$=0.146). The specimen broke at a temperature of 105° C. before reaching the maximum temperature of 150° C. Consequently the oscillating force was reduced to 1 N and the experiment repeated. The dimensions of the second specimen were 3.24 mm thick, 11.71 mm wide, and 17.14 mm in length. The instrument ceased testing this specimen at 115° C. due to the flattening of the storage and loss modulus curves. The transition temperature decreased to 72.59° C. with a storage modulus of 262 MPa and a loss modulus of 33 MPa (tan $\delta$=0.127). This specimen was further tested to determine if heating in the DMA furnace would affect the curing. The transition increased by 2.6% to 74.55° C. The storage modulus increased from 260 MPa to 350 MPa and the loss modulus increased from 33 MPa to 45 MPa. The increase in tan $\delta$ from 0.127 to 0.129 could be due to further curing, increased cross linking at the molecular level, thermal reorganization of polymer chain segments to a more stable conformation, or a combination of the three.

DMA testing of $F_{111C}$ utilized the same parameters as that used for $F_{111B}$. A rectangular specimen of $F_{111C}$ having the dimensions 3.23 mm thick, 11.70 mm wide, and 17.15 mm in length was held between the clamp holders and heated at a rate of 5° C./min starting from room temperature up to 150° C. The frequency was maintained at 1 Hertz. Two transition temperatures were observed the first occurred at 70.31° C. and the second at 137.59° C. This suggests that further curing resulted under thermal treatment. The first transition temperature occurred with a storage modulus of 114 MPa and loss modulus of 12 MPa (tan $\delta$=0.105). The second transition occurred at a temperature of 137.59° C. had a storage modulus of 40 MPa and loss modulus of 3 MPa (tan $\delta$=0.069), which suggests the transition to a less stiff material at a temperature of 137.59° C. (see FIG. 6).

DMA testing of $F_{112}$ could not be performed because the specimen was too fragile.

Figure 6:
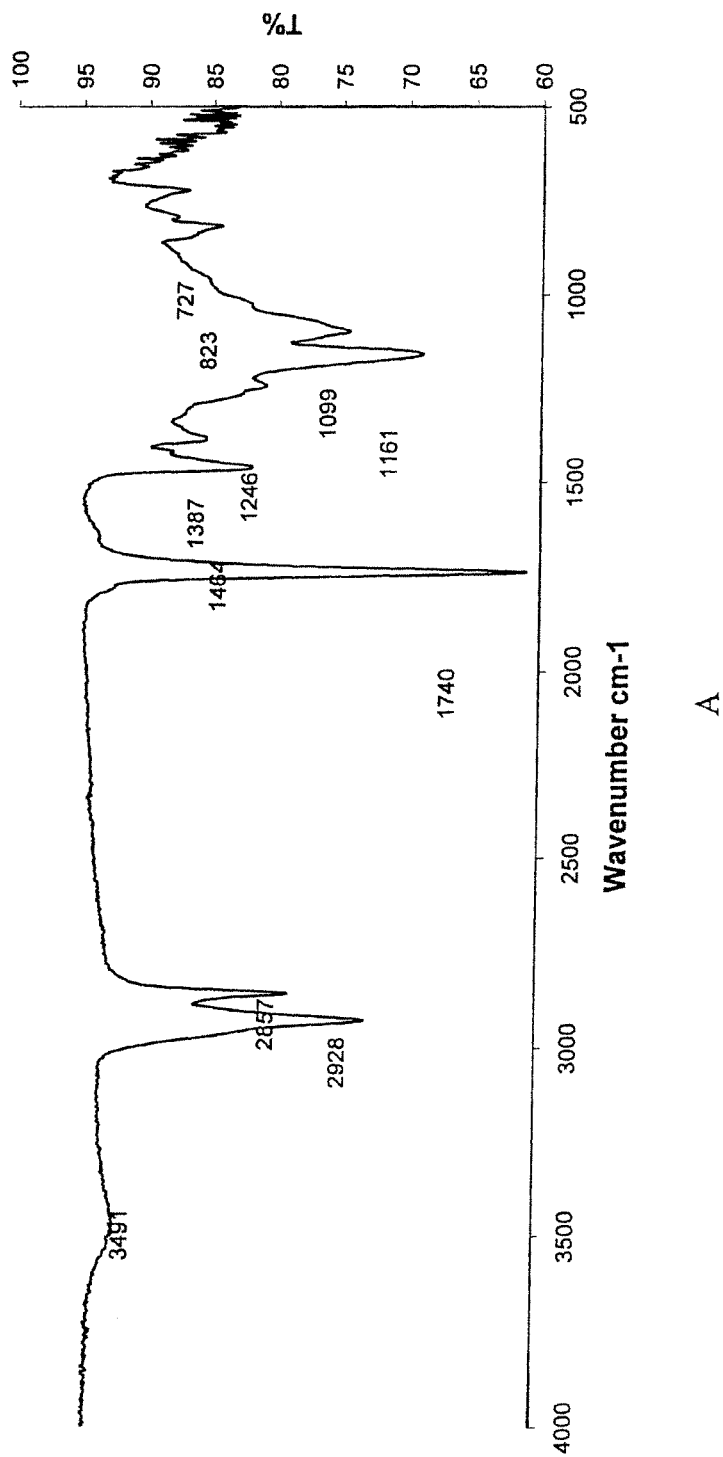
FIG. 6A) is an IR spectra of $F_{111C}$ thermally cured material of the formulation containing non-stoichiometric amounts of linseed oil with itaconic anhydride following UV irradiation, B) dynamic mechanical analysis of the material in 6A.

IR spectra were obtained for each of the cured polymers. The data suggest that the only significant difference was that the carbonyl group of IA completely reacted and was absent from the thermally cured material in $F_{112}$ and $F_{111C}$. Finally the carbon-carbon double bond for each was absent, suggesting that these bonds had fully reacted. IR spectra of $F_{111C}$ is shown in FIG. 6.

Experiment 2

Polymerization of Stoichiometric Amounts of ELO with IA

Formulation 1, Regime 2, Path 1, Stage B ($F_{121B}$), Stoichiometric amounts of ELO and IA were utilized based on the epoxid number of ELO which was 9.84 wt percent of epoxid oxygen. Two equivalents of epoxid oxygen were reacted with one equivalent of IA to produce one equivalent of IA crosslinked with two oxirane groups. Approximately 4.45 g (0.040 mol) IA and 12.9 g of ELO (0.013 mol) were mixed with constant heating until IA was completely dissolved. and a clear viscous pre-resin liquid was obtained. Approximately 0.08 g ($3.77 \times 10^{-4}$ mol) of benzoin (Bz) was then added to the viscous liquid and mixed. The mixture was then poured into a mold and placed in sunlight for 16 hours. Following exposure a stiff yellow material was obtained.

Formulation 1, Regime 2, Path 1 Stage C ($F_{121C}$) The polymer obtained in $F_{121B}$ was further cured by heating in an oven at 100° C. for 12 hours to assess the extent of photochemical curing.

Formulation 1, Regime 2 Path 2, Stage B ($F_{122B}$) The pre-resin of $F_{121B}$ was poured into a mold and heated in an oven at 100° C. for 12 hours for direct thermal curing. The resultant material was oily, consequently it was heated for an additional 12 hours. The resulting material was a flexible fragile yellow material.

DMA testing was initially performed at 1 N oscillating force. Viscoelastic properties of the cured materials in this Example were obtained using the TA DMA Q800 instrument (CAS-MI Laboratory, Ypsilanti, Mich.) in a single cantilever clamp. The specimen of $F_{111B}$ was rectangular having the dimensions, 2.89 mm thick, 12.11 mm wide, and 17.47 mm in length. A single major transition was obtained at 87.20° C. with a storage modulus of 187 MPa and loss modulus of 29 MPa (tan δ=0.156).

Figure 7:
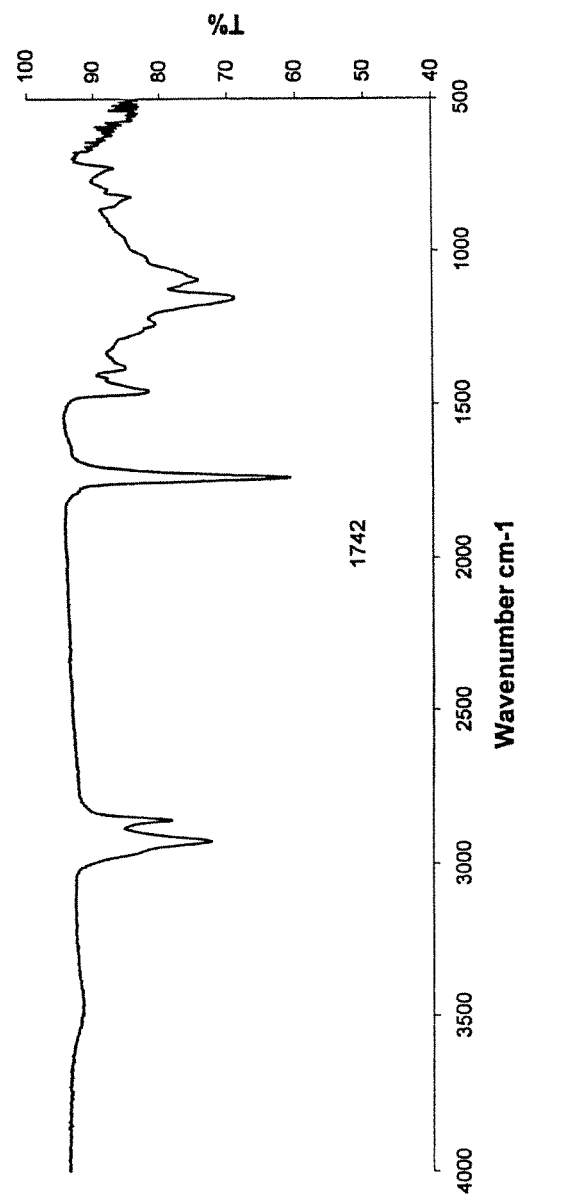
FIG. 7A) is an IR spectra of $F_{121C}$ cured thermally cured material of the formulation containing stoichiometric amounts of linseed oil with itaconic anhydride following UV irradiation, B) dynamic mechanical analysis of the material in 7A using 1N oscillating force.

DMA testing of $F_{121C}$ utilized the same parameters as that used for $F_{121B}$. The specimen of $F_{121C}$ was rectangular having the dimensions of 2.88 mm thick, 12.08 mm wide, and 17.44 mm in length. Two transitions were obtained. The first transition occurred at a temperature of 70.16° C. with a storage modulus of 443 MPa and a loss modulus of 47 MPa (tan δ=0.106). The second transition occurred at 153.85° C. with a storage modulus of 84 MPa and a loss modulus of 10 MPa (tan δ=0.114). Compared with the cured material obtained in $F_{121B}$, the transition temperatures decreased by 20% from 87.20° C. (187, 29 MPa storage and loss modulus, respectively) (see FIG. 7).

DMA testing of $F_{122B}$ was performed at temperatures ranging from room temperature to 200° C. under a 1 N oscillating force with the same parameters as that used for $F_{121B}$. The specimen was rectangular having the dimensions 3.11 mm thick, 11.12 mm wide, and 17.35 mm in length and broke at a temperature of 101° C. with only a single transition observed at 52.25° C., a storage modulus of 63 MPa and a loss modulus of 15 MPa (tan δ=0.238). This test was repeated at an oscillating force of 0.5 N using a specimen with dimensions 3.09 mm thick, 11.13 mm wide, and 17.35 mm in length. At 168° C. the specimen broke having a single transition at 58.12° C., a storage modulus of 66 MPa and loss modulus of 18 MPa (tan δ=0.264).

The IR spectra suggested that there was no substantial difference between the cured materials $F_{121B}$ and $F_{121C}$ further suggesting that the photochemically cured material at stage B was completely cured.

Experiment 3

Polymerization of Stoichiometric Amounts of ELO with IA in the Presence of Free-Radical Initiator Benzoyl Per-Oxide Formulation 1, Regime 4, Path 1, Stage B ($F_{141B}$), Stoichiometric amounts of ELO and IA were utilized as in Example 2 above with the addition of approximately 0.1 g benzoyl per-oxide (BPO, 4.13×10$^{-4}$ mol) during mixing to enhance the free radical polymerization. The mixture was poured into a mold and left at room temperature for 1 hour. When no curing was evident the material was heated in an oven at 100° C. for 12 hours. The resulting material was a rigid polymer.

DMA testing was performed using a specimen having dimensions of 3.47 mm thick, 12.16 mm wide, and 17.22 mm in length at 1 N oscillating force with temperatures ranging from room temperature to 200° C. Two transition temperatures were observed. The first transition occurred at 77.71° C. with a storage modulus of 439 MPa and a loss modulus of 48 MPa (tan δ=0.108), and the second occurred at 148.74° C. with a storage modulus of 126 MPa and a loss modulus of 10 MPa (tan δ=0.075) (see FIG. 8).

The IR spectra showed no significant differences from that obtained for $F_{122B}$ in Example 2 above.

Experiment 4

Polymerization of Non-Stoichiometric Amounts of ELO with IAc

Formulation 2, Regime 1, Path 1, Stage B ($F_{211B}$), Non-stoichiometric amounts of ELO and IAc were utilized because prior experiments with stoichiometric amounts of the copolymers produced a gelled material that could not be molded. Consequently the amount of IAc was reduced arbitrarily by 25%. Approximately 12.9 g of ELO (0.013 mol) and 3.87 g (0.30 mol) IAc were mixed in a flask with constant heating until the IAc dissolved completely and a viscous pre-resin liquid was obtained. Approximately, 0.08 g (3.77× 10$^{-4}$ mol) of Bz was then added to the viscous liquid and mixed. The mixture was then poured into a mold and placed in sunlight for 16 hours. Following exposure a rigid transparent polymer was obtained.

Formulation 2, Regime 1, Path 1, Stage C ($F_{211C}$) The polymer obtained in $F_{211B}$ was further cured by heating in an oven at 100° C. for 12 hours to assess the extent of photochemical curing. A yellow, opaque polymer was obtained.

Formulation 2, Regime 1 Path 2, Stage B ($F_{212B}$) The pre-resin of $F_{211B}$ was poured into a mold and heated in an oven at 100° C. for 12 hours for direct thermal curing. The resulting material was a rigid bright yellow polymer.

DMA testing of $F_{211B}$ was performed using a specimen having dimensions of 3.02 mm thick, 12.12 mm wide and 17.02 mm in length at 1 N oscillating force with temperatures ranging from room temperature to 150° C. A single transition temperature was observed at 101.46° C. with a storage modulus of 27 MPa and loss modulus of 4 MPa (tan δ of 0.128).

DMA test was performed on $F_{211C}$ with dimensions of 3.00 mm thick, 12.14 mm wide, and length of 17.43 mm in length with 1 N oscillating force. The temperature range was used from room temperature to 150° C. A single transition occurred within the cured material at 68° C. with a storage modulus of 302 MPa and a loss modulus of 58 MPa (tan δ=0.193) (see FIG. 8).

DMA test was performed on $F_{212B}$ with dimensions 3.05 mm thick, 12.10 mm wide and 17.29 mm length with 1N oscillating forge. The temperature range was from room temperature to 200° C. A single transition temperature was observed at 48.24° C. with a storage modulus of 77 MPa and loss modulus of 43 MPa (tan δ=0.554).

Figure 8:
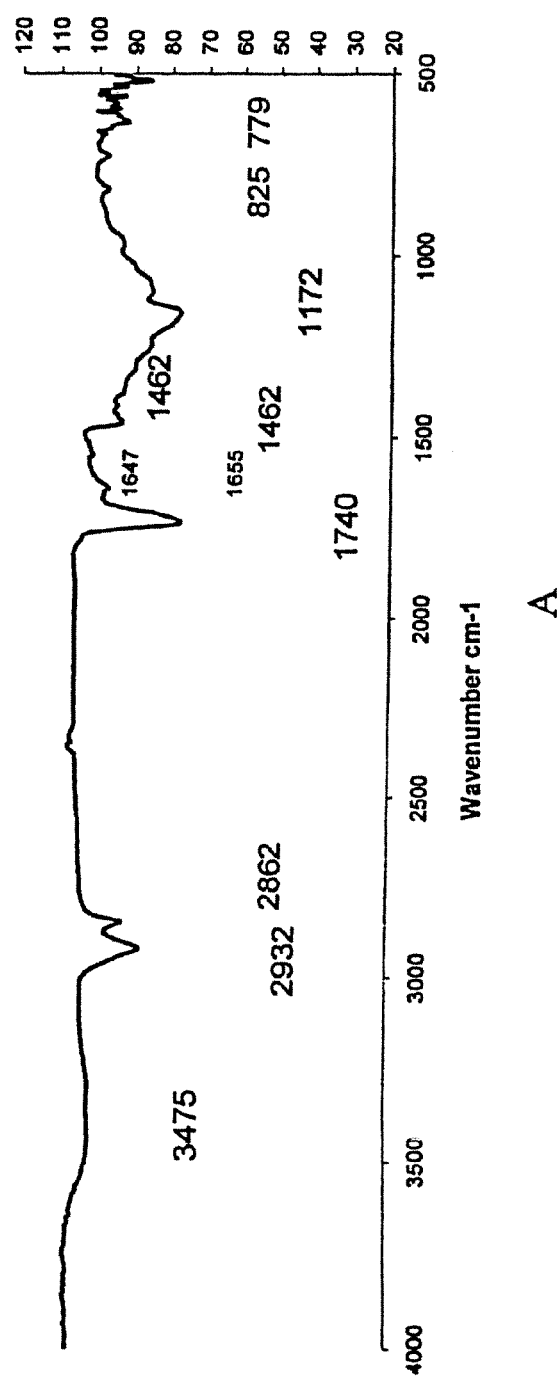
FIG. 8A) is an IR spectra of $F_{211C}$ cured thermally cured material of the formulation containing stoichiometric amounts of linseed oil with itaconic anhydride and benzoyl peroxide following UV irradiation, B) dynamic mechanical analysis of the material in 9A using 1N oscillating force.

IR spectral data showed the presence of carbon-carbon double bond that did not completely reacted in the cured material from formulation 2 (see FIG. 8).

Experiment 5

Polymerization of stoichiometric Amounts of AESO with AA

Formulation 3, Regime 1, Path 1, Stage B ($F_{311B}$), Approximately 6.11 g (0.085 mol) of A.A and 12.9 g (0.014 mol) of ESO were mixed with constant heating until AA was completely dissolved and a viscous pre-resin liquid was obtained. Approximately, 0.08 g (3.77×10$^{-4}$ mol) of benzoin (Bz) was then added to the viscous liquid and mixed. The mixture was then poured into a mold and placed in sunlight for 16 hours. Following exposure a rigid milky white material was obtained.

Formulation 3, Regime 1, Path 1 Stage C ($F_{311C}$) The polymer obtained in $F_{311B}$ was further cured by heating in an oven at 100° C. for 12 hours to assess the extent of photochemical curing.

Formulation 3, Regime 1 Path 2, Stage B ($F_{312B}$) The pre-resin of $F_{211B}$ was poured into a mold and heated in an oven at 100° C. for 12 hours for direct thermal curing. The resulting material was a rubbery brown yellow polymer.

DMA testing of $F_{311B}$ was performed using a specimen having dimensions of 2.39 mm thick, 11.31 mm wide, and 17.49 mm in length at 1 N oscillating force with temperatures ranging from room temperature to 200° C. The specimen broke at 74° C. A single transition temperature was observed at 67.93° C. with storage modulus of 14 MPa and loss modulus of 12 MPa (tan δ=0.814).

A DMA test of $F_{311C}$ was performed using a specimen with dimensions of 2.30 mm thick, 11.38 mm wide, and 17.38 mm in length with oscillating force of 1 N and temperature range from room temperature up to 150° C. (FIG. 3.42). A single transition temperature was observed at 140.59° C. with storage modulus of 60 MPa and loss modulus of 13 MPa (tan δ=0.214).

A DMA test of $F_{312B}$ was performed using a specimen with dimensions of 2.41 mm thick, 11.70 mm wide, and 17.32 mm in length with 1 N oscillating force and temperature range from room temperature up to 200° C. The specimen broke at 74° C. A single transition temperature was observed at 35.82° C. with storage modulus of 50 MPa and loss modulus of 27 MPa (tan δ=0.543). The oscillating force used was decreased to 0.5 N and a second specimen was tested having the dimensions of 2.39 mm thick, 11.70 wide, and 17.32 mm in length. When the force was decreased the transition temperature increased to 38.18° C. with storage modulus of 38 MPa and loss modulus of 20 MPa (tan δ=0.526) at the point where the specimen broke at 64° C.

IR spectra suggests only difference detected was that the carbon-carbon double bonds of $F_{311B}$ were not completely reacted.

Example 6

Analysis of ELO and AESO Polymers

Infrared Analyses

Molecular chemical analysis of all polymeric materials was performed on a Fourier transform infrared instrument (Bio-Rad FTS 6000 spectrometer Bio-Rad, Hercules, Calif.) in the region of 4000-500 cm$^{-1}$.

IR spectra confirmed the presence of C=O groups of the triglyceride ester carbonyl groups in addition to new esters that were formed from the reaction ELO epoxide rings with IA. The carbon-carbon double bond peak decreased in intensity with increasing cross linking and epoxy group ring deformation was observed by the presence of the C—O bond peak.

In the case of thermal cure utilizing anhydride as the cross linking compound, the anhydride functionality disappeared, and in the photochemical cure, the anhydride was still present. This strongly suggests that photochemical curing resulted in a preferential reaction of the carbon-carbon double bond. Thus, a preferential reaction may be brought about by different cure conditions, and the thermomechanical properties of the materials may be attributed to the occurrence of different chemistries or mixtures of chemistries brought. These chemistries may occur by either (1) photochemical conditions which facilitate cross linking by carbon-carbon double bond radical polymerization, (2) thermal conditions without radical initiator which facilitate cross linking of epoxide and anhydride to form a polyester network or (3) thermal conditions with radical initiator which affect both the previous chemistries and which result in a dense, highly crosslinked, "doubly crosslinked" thermoset comprised of both a polyester and polyethylene network. Visual examination of each kind of cure additionally supports these conclusions: (1) photopolymerization alone resulted in a stiff strip having no rubbery character as is common with many triglyceride systems, (2) thermal polymerization without radical initiator resulted in a polymerized, but rubbery strip which was easily flexed, and (3) photopolymerization followed by thermal treatment gave a rigid strip, as did thermal polymerization alone when conducted in the presence of a radical initiator.

Dynamic Mechanical Analyses

DMA testing was initially performed at 10 N oscillating force. Viscoelastic properties of the cured materials in the Examples were obtained using the TA DMA Q800 instrument (CAS-MI Laboratory, Ypsilanti, Mich.) in a single cantilever clamp. A rectangular specimen of $F_{111B}$, was held between the clamp holders and heated at a rate of 5° C./min starting from room temperature up to about 150° C. The frequency was maintained at 1 Hertz.

The resultant polymeric material with non-stoichiometric amounts of IA under thermal cure conditions alone was flexible and easily torn (for the latter reason tensile testing was not possible since the clamps tore the poorly crosslinked, rubbery materials obtained from non-stoichiometric formulations). When a stoichiometric amount of IA was used under thermal cure alone, however, an opaque and stiff material was obtained that did not tear. The resultant polymeric material using non-stoichiometric amount of IA indicated that poor crosslinked material was obtained. No DMA characterization was performed for the flexible polymeric materials and DMA characterization was conducted for the material obtained using stoichiometric amount of IA.

The transition temperatures of the polymeric materials observed after DMA characterization as well as the different crosslink densities ($v_e$) indicated that either rubbery or rigid plastic materials were obtained. The crosslink density of the crosslinked polymeric materials was determined by rubber elasticity theory:

$$E'=3v_e RT$$

Where E' is the storage modulus of the crosslinked polymer in the rubbery plateau region above the transition temperature (T+42 for the polymeric materials), R is the universal gas constant (8.314472 m$^3$·Pa·K$^{-1}$·mol$^{-1}$), and T is the absolute temperature (K). The existence of two transition temperatures may indicate two kinds of crosslinks, regions that would be expected to differ either in length, flexibility, or both. A master summary table of DMA parameters is shown with calculated crosslink densities for each sample in FIG. 10.

Crosslink densities correlate with the tan δ such that greater cross-linking reduces segmental motions required for viscous liquid performance. This is indicated by the following equation derived from the kinetic theory of rubber elasticity:

$$v_e=(\text{Loss Modulus/tan }\delta)/3RT$$

Consequently, as the crosslink density increases, the tan δ value as a function of temperature decreases due to an increase of loss modulus.

As anticipated, without BPO the only cross-linking polymerization that is chemically able occurs during a thermal cure is between the epoxy function group from ELO and the anhydride functional group from IA with the formation of ester functionality. BPO was the only way found to successfully initiate the polymerization of the carbon-carbon double bonds present in the IA material, although any radical initiator in theory other than BPO would also work. Two kinds of cross-linking were able to occur if radical as well as thermal combinations of conditions were used. This led to the highest storage modulus material at any temperature range tested for the $F_{141}$ B polymeric material. The storage modulus showed a gradual decrease with increasing the temperature (storage modulus at room temperature was observed to be 323 MPa for the $F_{122}$ B material and 957 MPa for the $F_{141}$ B material). This was being attributed to segmental motions of the crosslinked polymeric materials molecules.

CONCLUSIONS

In the photochemically cured polymers, the storage moduli (625 MPa ($F_{111B}$), 771 MPa ($F_{121B}$), 363 MPa ($F_{131B}$), and 203 MPa ($F_{211B}$) at room temperature, with the tan δ peak occurring at transition temperatures of 73, 87, 66, and 102° C., respectively) it appears that further curing occurred in the DMA which was not obtained by photochemical means alone.

A significant change was observed in the storage modulus upon thermal cure conducted after photochemical cure had already been achieved.

Characteristically, good damping materials show a high tan δ, since an increase of crosslink density greatly restricts the motion of the molecular segments, and the amount of energy that might be dissipated within the utilized condition greatly decreases. Generally, if tan δ is greater than 0.3 within temperatures ranging from at least 60°-80° C. a good damping material exists. $F_{311}$ B, demonstrated damping in this preferred range (tan δ 0.86 at a temperature of 68° C.).

The DMA data for the polymers having the desired characteristics for structural plastics are shown in FIG. 10. Examination of the tan δ curves strongly suggests the presence of polyester crosslinks in all four of the materials as would be expected from thermal curing which alone is able to cause the epoxide functionality to react with the anhydride functionality.

Two cross-linking events are occurring, polyester and polyethylenic crosslinks, the first from thermal reaction and the second from radical polymerization. It is important to note that thermal conditions facilitated to a greater degree (than sequential photochemical followed by a separate thermal cure) the formation of the two kinds of crosslinks at the same time, although by different mechanisms; the heat utilized during this cure enabled a more thorough degree of cure by thermodynamic factors alone than was possible with applying two separate cure types, that kinetically locks the material after the first stage, thus inhibiting the extent of thermal reaction possible in the second stage.

Figure 9A:
FIG. 9A) is a temperature dependence of the storage modulus (E') and loss factor (tan δ) for the photochemically cured followed by thermal cure condition of the material in FIG. 6, FIG. 7, and FIG. 8, B) is a temperature dependence of the storage modulus (E') and loss factor (tan δ) for the photochemically cured followed by thermal cure condition of the material in FIG. 6 and FIG. 7.
Figure 9:
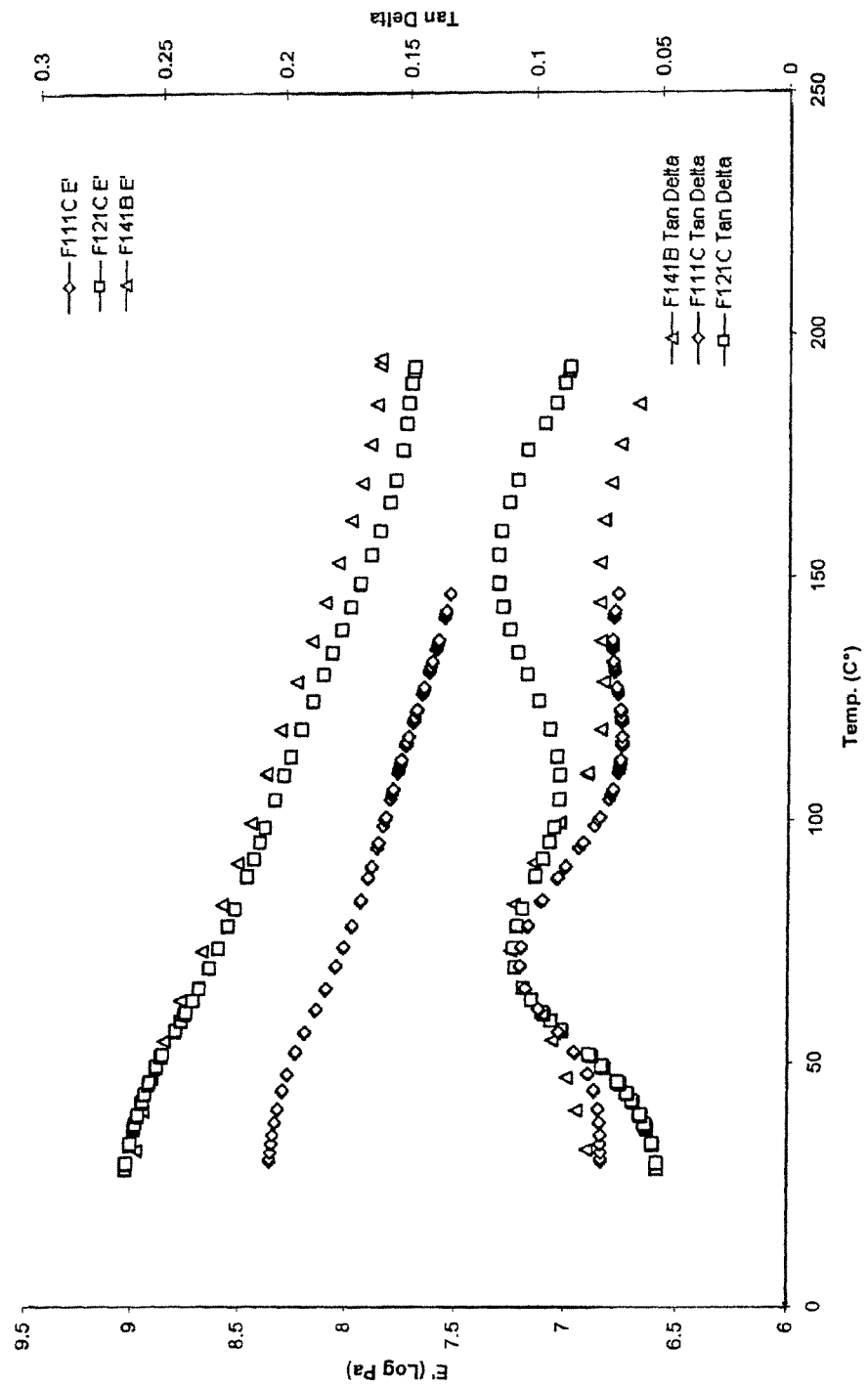

Two transition temperatures were observed for the polymers $F_{111C}$, $F_{121C}$, and $F_{141B}$. The Data strongly argues in favor of the likelihood that each of the two transitions seen in the tan δ curves arise from separate molecular segmental species at different temperatures (FIG. 9). Thus, segmental motion between polyester crosslinks appears at approximately 60 to 75° C., which the segmental motion between polyethylenic crosslinks does not occur until approximately 150° C. Those polymers thermally cured established both kinds of crosslinks under conditions used in the oven (100° C.) allowing maximal chain mobilities to occur throughout the entire cure regime and facilitate maximal cross-linking, of both types, resulting in a greater crosslink density than photochemical curing followed by thermal curing.

We claim:

1. A polymer plastic consisting of a mixture of epoxidized linseed oil and itaconic anhydride; wherein the mixture is cured using both ultraviolet radiation and heat with an ultraviolet radiation activated catalyst and a heat activated catalyst present in the mixture, wherein the polymer plastic has a modulus of 625 MPa or greater.

2. The polymer plastic according to claim 1 wherein said heat activated catalyst is benzoyl peroxide or 2,2'-azo-bis-isobutyronitrile.

3. The polymer plastic according to claim 1 wherein the amount of said ultraviolet radiation activated catalyst or heat activated catalyst is not less than about 0.01 percent by weight.

4. The polymer plastic according to claim 1 wherein the amount of said ultraviolet radiation activated catalyst or heat activated catalyst is more than about 1.00 percent by weight.

5. The polymer plastic according to claim 1 wherein said epoxdized linseed oil is partially unsaturated and partially epoxidized.

6. The polymer plastic according to claim 1 wherein said epoxidized linseed oil is fully epoxidized.

7. The polymer plastic according to claim 1 wherein said ultraviolet radiation activated catalyst is benzoin and said heat activated catalyst is benzoyl peroxide.

\* \* \* \* \*